Sept. 29, 1959     J. HALTENBERGER     2,906,092
GAS TURBINE ENGINE WITH EXHAUST HEAT RECOVERY
Filed Feb. 10, 1955
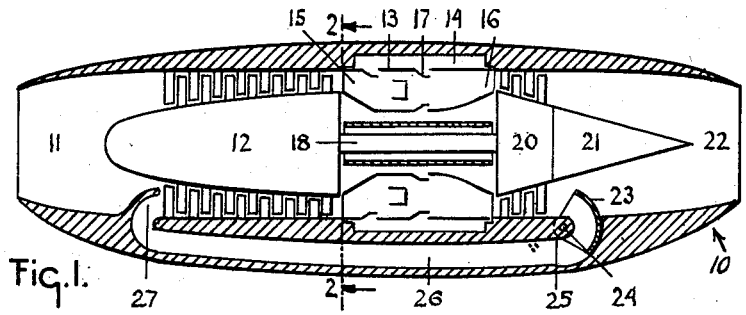
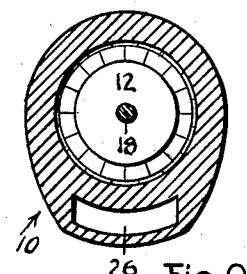
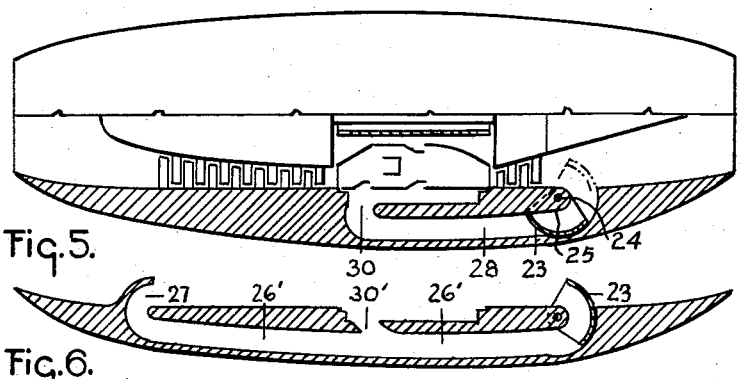
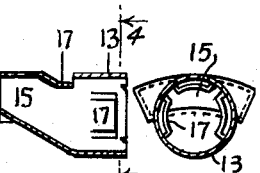
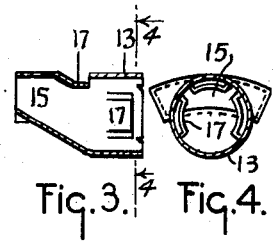
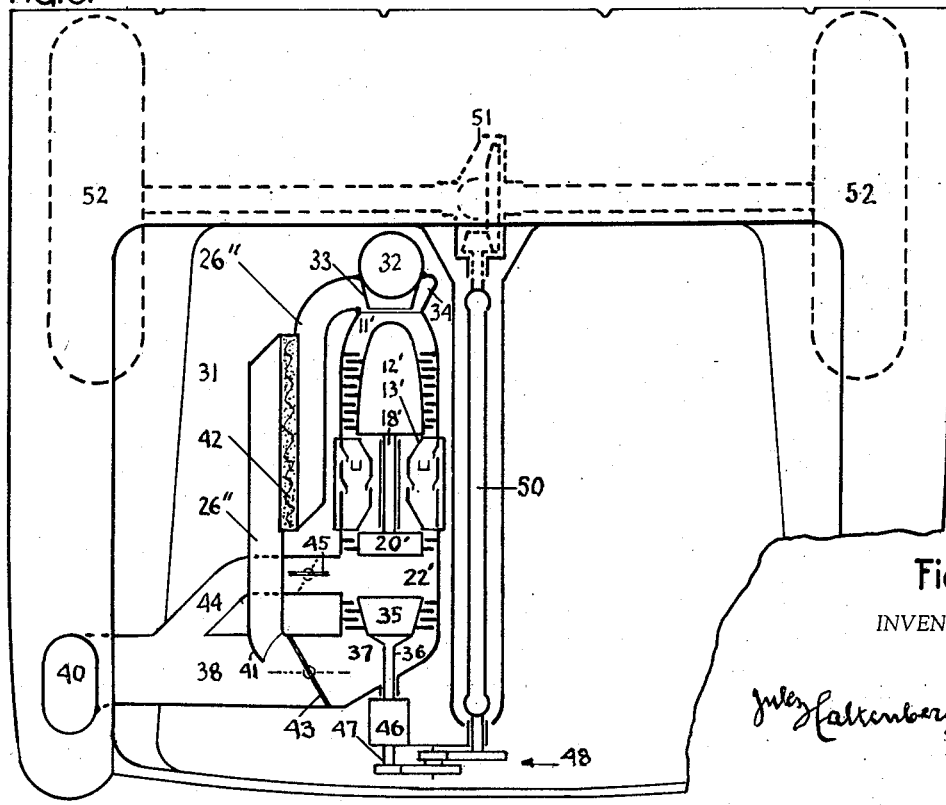
INVENTOR United States Patent Office 2,906,092
Patented Sept. 29, 1959

2,906,092
GAS TURBINE ENGINE WITH EXHAUST HEAT RECOVERY

Jules Haltenberger, Rancho Santa Fe, Calif.

Application February 10, 1955, Serial No. 487,409

3 Claims. (Cl. 60—39.16)

The present invention pertains to gas turbine temperature control, and in part relates to my co-pending application Serial No. 441,390 for Gas Turbine Temperature Control, filed July 6, 1954, now titled Turbine Structure Expansion Refrigeration Cooling.

It is known, that the temperature of the fast rotating turbine blades, is the present day limiting factor of a gas turbine volumetric and thermal efficiency.

To hold the blade temperature to a value which prevents disintegration, all turbines that applicant is aware of, provide to compress and transmit many time the volume of ambient air needed for complete combustion of the provided fuel.

For heat regeneration, it was proposed to heat the ambient air, by an indirectly operating exhaust heat exchanger.

It is here proposed, and is the object of my invention, to provide direct heat regeneration, and the lowering of the blades temperature by exhaust gas cooling and or by replacing the large amount of excess air by a smaller amount of exhaust gas that enters into the compressor.

Further objects will appear as the description proceeds.

Referring to drawings: Fig. 1 is a schematical presentation of a lengthwise section of a turbojet powerplant; Fig. 2 is a section on line 2—2 of Fig. 1; Fig. 3 is an enlarged forward portion of a combustion chamber shown in Fig. 1; Fig. 4 is a section on line 4—4 of Fig. 3; Fig. 5 is a modification of the invention; Fig. 6 illustrates the exhaust ducting, combining the proposals shown in Fig. 1 to 5, inclusive; Fig. 7 is a schematical presentation of the invention as applied in one form to a turbine, installed in the rear luggage compartment of an automobile, here illustrated in a somewhat smaller scale.

Referring to Figs. 1 to 4, inclusive, it will be seen, that an aerodynamically shaped turbojet housing generally at 10 is provided with an ambient air inlet passage 11, axial compressor 12, and combustion chambers 13 in chamber housing 14. The chambers are provided with an inlet 15, outlet 16 and injector lips 17 therebetween. The compressor, as by shaft 18, is operatively interconnected to the compressor driving turbine 20, having a tail portion 21 centrally disposed in exhaust passage 22.

In the path of the turbine exhaust, an adjustable clam shell control valve 23 is provided and fulcrumed on pin 24, held in wall 25, a part of housing 10, here illustrated protruding from the inner wall of the exhaust passage (dots indicate closed position). In this position it harnesses a part of the kinetic energy of the exhaust, and also transfers a portion of the exhaust gases to duct 26, that extends forwardly and terminates in a rearward injector effect loop 27, admitting a portion of the turbine hot exhaust into the air compressor.

In operation, the heat transferred from the exhaust to the compressor is a gain in regeneration, and of particular value to high flying airplanes. The admission of heat by the exhaust gas, which is substantially free of oxygen, dilutes the ambient air, this fluid flow reduces the flame temperature and reduces the blade temperature to an operating range. For a predetermined performance, the reduction in the size of compressor and fuel to drive same becomes available, or inversely, a given compressor will deliver materially increased thrust horsepower at higher overall thermal efficiency.

By this proposal, applicant changes a gas turbine performance where quantity gas (air many times more than needed for perfect combustion) is used to distribute the generated heat, to quality (warm gas without oxygen) to cool the chambers and cool the burning flames in one aspect, and a regenerative heat gain in another aspect, assuring a cooler exhaust and less volume thereof.

Fig. 5 illustrates a modification. Here, a reduced amount of ambient air is compressed, and when reaching the combustion chambers, the air is diluted by the exhaust gases in the chamber housing, as delivered thereto by duct 28, having a terminal outlet 30 (this pressure approximates the pressure in the exhaust chamber). The provided injector lips assure dilution.

To start this engine, applicant prefers to close control valve 23 as illustrated, and to open and adjust the valve to heat and pressure metering, when gas velocity is able to affect the venturi lips, and gas pressure becomes available in the exhaust passages.

In operation, a compressor having an output only somewhat larger than the needed air for combustion will suffice, by fluid dilution and increased cooling by exhaust gas under pressure the blade temperature is reduced. Exhaust gas though hot is cooler than the blade temperature upper operating limit.

For certain applications, applicant combines the exhaust guidance into the compressor and also into the combustion chamber housing. To avoid mere duplications of drawings, applicant in Fig. 6 only illustrates the exhaust duct. Here control valve 23 (its effect was described in connection with Figs. 1 to 5, inclusive), the forwardly extending duct 26', and terminal loop 27 thereof duplicates the one described in connection with Figs. 1 to 4 inclusive; here, however, an additional outlet 30' is provided. This modification is not a mere aggregation, it has the advantage of the ambient air heating (very important in high altitude planes) and a reduced load on the compressor, in combination with the freely available combustion chamber and flame cooling by exhaust gas.

For simplicity, in the schematical presentation, applicant illustrates the various ducts as integral with the housing 10; in reality ducts are separate high heat resisting material tubings, where an exhaust gas temperature decrease does take place. All airplane powerplants that applicant is aware of, build the powerplant of many units, and they are ultimately covered with an aerodynamically shaped removable outside skin.

Fig. 7 illustrates one form of the invention when applied to a turbine powerplant, disposed in the rear luggage compartment of a pleasure car automobile. Here, the floor 31 of a luggage compartment floor supports a powerplant having a substantially vertical air inlet 32, downwardly terminating in an injector nozzle 33 having a surrounding injector outer cone 34 (to be described). The powerplant for fluid downstream flow includes an ambient air inlet 11' on an axial air compressor 12' having a compressed air output, said output is guided into a combustion chamber 13' (usual fuel injection not shown) having a motivating gas output. The compressor, as by shaft 18', is operatively interconnected to a compressor driving turbine 20' having an exhaust passage 22'. Spaced from the driving turbine the exhaust passage includes an independent power turbine 35 having an output shaft 36 (to be described) passing through an exhaust passage extension 37.

Extension 37 is provided with an exhaust pipe 38, terminating in a substantially vertical outlet 40, disposed on the usual rear fender extension.

The exhaust pipe is provided with an exhaust guiding duct 26″, having a scooping portion 41; the forward end thereof through an exhaust gas filter 42 is terminally connected to the described injector outer cone 34.

The exhaust pipe 38 also includes a closeable valve 43. With this valve in closed position, all the exhaust escapes through a by-pass 44 positioned in-between the two turbines and having a valve 45, and the exhaust ducting to the compressor remains inoperative until the opening of this valve.

The drawing illustrates the control valve position when the automobile is decelerating (or engine is started). For accelerating and normal driving the two described valves are positioned in their chain-line indicated positions.

This proposal has many advantages. It is light in weight, by reducing the quantity of compressed air and using the available heated exhausted gas as air diluent the blade temperature is held within working range.

It is known that gas turbine driven automobiles fail to decelerate at the rate of other automobiles on the road. At the release of the usual accelerator (valve 45 opened) valve 43 being closed, power turbine 35 deprived of motivating gas will decelerate the vehicle.

Output shaft 36 is provided with a usual automobile type change speed mechanism in box 46, having an output shaft 47 and speed reduction gearings generally at 48 which drive a propeller shaft 50 through rear axle gears in housing 51, the wheels 52, in the usual well known manner.

It is believed, that the here proposed turbine heat regeneration, cooling of combustion chambers by exhaust gas and air dilution by exhaust, or either of these proposed will materially increase the value of gas turbines for all applications now used or contemplated.

While I have herein shown and described only certain specific embodiments of my invention, and have suggested only certain possible modifications, it will be appreciated that many changes and variations can be made to suit particular conditions and embodiments of use, without departing from the spirit and scope of my invention.

I claim:

1. In a gas turbine powerplant an air compressor having an ambient air inlet and a compressed air output, means ducting said output into a combustion chamber having a motivating gas output, said motivating gas operating a single gas turbine having means for driving said air compressor and having an exhaust passage, said passage provided with an exhaust by-pass with a valve therein, a single independent power turbine in said exhaust passage having a power output shaft and an exhaust gas passage extension with an exhaust pipe and a valve therein, powerplant thermal efficiency increasing means comprising, an exhaust guiding duct connecting said power turbine exhaust pipe to said ambient air inlet, whereby, when said exhaust by-pass valve is closed and said exhaust valve is open; a portion of the exhaust gas is guided into said air compressor ambient air inlet, and when said valves positions are reversed; exhaust gas is prevented from reaching the air compressor.

2. The invention defined in claim 1, wherein, the air compressor ambient air inlet forms an injector nozzle and is connected to said exhaust guiding duct.

3. In a gas turbine powerplant an air compressor having an ambient air inlet and a compressed air output, means ducting said output into a combustion chamber having a motivating gas output, said compressed air and motive gas forming a motive fluid for operating a single gas turbine, said turbine connected to drive said air compressor and having an exhaust passage, said passage provided with an exhaust by-pass with a valve therein, a single independent power turbine in said exhaust passage having a power output shaft and an exhaust gas passage extension with an exhaust pipe and a valve therein, powerplant thermal efficiency increasing means comprising, an exhaust guiding duct connecting said power turbine exhaust pipe to the motive fluid flowing to said first mentioned turbine, whereby, when said exhaust by-pass valve is closed and said exhaust valve is open; a portion of the exhaust gas is guided into said fluid flow, and when said valves positions are reversed; exhaust gas is prevented from reaching said fluid flow.

References Cited in the file of this patent

UNITED STATES PATENTS

| | | |
|---|---|---|
| 2,578,478 | Janes | Dec. 11, 1951 |
| 2,608,822 | Pavlecka et al. | Sept. 2, 1952 |
| 2,697,492 | Destival | Dec. 21, 1954 |
| 2,705,866 | Quinby et al. | Apr. 12, 1955 |
| 2,721,445 | Giliberty | Oct. 25, 1955 |

FOREIGN PATENTS

| | | |
|---|---|---|
| 541,307 | Great Britain | Nov. 21, 1941 |
| 613,392 | Great Britain | Nov. 25, 1948 |
| 638,079 | Great Britain | May 31, 1950 |
| 645,588 | Great Britain | Nov. 1, 1950 |
| 662,867 | Great Britain | Dec. 12, 1951 |
| 421,568 | Italy | May 28, 1947 |
| 455,323 | Italy | Feb. 22, 1950 |